US008437347B2

(12) United States Patent
Casaccia et al.

(10) Patent No.: US 8,437,347 B2
(45) Date of Patent: May 7, 2013

(54) SCALABLE ENCODING FOR MULTICAST BROADCAST MULTIMEDIA SERVICE

(75) Inventors: Lorenzo Casaccia, Rome (IT); Francesco Grilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1269 days.

(21) Appl. No.: 10/898,643

(22) Filed: Jul. 23, 2004

(65) Prior Publication Data

US 2005/0129018 A1   Jun. 16, 2005

Related U.S. Application Data

(60) Provisional application No. 60/511,276, filed on Oct. 14, 2003.

(51) Int. Cl.
*H04L 12/28* (2006.01)

(52) U.S. Cl.
USPC ........... 370/390; 370/474; 370/389; 370/351; 370/312; 375/240.26; 375/240.08; 375/240.16; 348/401; 348/430; 348/415

(58) Field of Classification Search ................... 370/390, 370/420, 310, 364, 395.4, 335, 389, 351, 370/312, 474, 476, 392, 538, 235, 230, 535, 370/536; 375/240.26, 240.1, 240.08, 240.13, 375/240.14, 240.16; 714/18; 348/401, 430, 348/415; 700/94; 380/20
See application file for complete search history.

(56) References Cited

U.S. PATENT DOCUMENTS

| | | | |
|---|---|---|---|
| 5,142,551 A * | 8/1992 | Borth et al. ................... 375/219 |
| 5,231,664 A * | 7/1993 | Bestler et al. ................. 380/241 |
| 5,499,295 A | 3/1996 | Cooper | |
| 5,742,343 A | 4/1998 | Haskell et al. | |
| 6,023,762 A * | 2/2000 | Dean et al. ..................... 713/193 |
| 6,337,881 B1 | 1/2002 | Chaddha ................... 375/240.16 |
| 6,614,846 B1 | 9/2003 | Fujiwara et al. | |
| 6,728,775 B1 | 4/2004 | Chaddha | |
| 6,757,241 B1 * | 6/2004 | Jones et al. .................... 370/208 |

(Continued)

FOREIGN PATENT DOCUMENTS

| EP | 1173028 A | 1/2002 |
|---|---|---|
| JP | 09023289 | 1/1997 |

(Continued)

OTHER PUBLICATIONS

"Support of Multimedia Broadcast Multicast Service (MBMS) in GERAN" 3GPP TSG GERAN METTING #13 Jan. 21, 2003, pp. 1-23, XP002290356.

(Continued)

*Primary Examiner* — Andrew Chriss
*Assistant Examiner* — Jamal Javaid
(74) *Attorney, Agent, or Firm* — Jeffrey D. Jacobs

(57) ABSTRACT

Methods and apparatus are described for broadcasting content. Encoding the content to be multicast/broadcast into multiple streams, wherein at least one stream provides a base portion of the content, and additional streams provide enhancements to the content. A wireless communication device receives the broadcast and decodes streams in accordance with the reception capabilities of the wireless device. The configuration of the wireless device can be determined based on the wireless device's capability to decode multiple streams. In addition, the configuration of the wireless device can be determined based on a subscriber level of the wireless device.

50 Claims, 8 Drawing Sheets

U.S. PATENT DOCUMENTS

| | | | |
|---|---|---|---|
| 7,072,366 B2 * | 7/2006 | Parkkinen et al. | 370/538 |
| 2002/0106985 A1 | 8/2002 | Sato et al. | |
| 2003/0021296 A1 * | 1/2003 | Wee et al. | 370/474 |
| 2003/0118054 A1 * | 6/2003 | Zhu et al. | 370/474 |
| 2003/0165274 A1 | 9/2003 | Haskell et al. | |
| 2004/0014482 A1 | 1/2004 | Kwak et al. | |
| 2004/0028004 A1 * | 2/2004 | Hayashi et al. | 370/320 |
| 2004/0081198 A1 | 4/2004 | Gardner et al. | |
| 2004/0153767 A1 * | 8/2004 | Dolgonos | 714/18 |

FOREIGN PATENT DOCUMENTS

| | | |
|---|---|---|
| JP | 10136017 A | 5/1998 |
| JP | 10336645 A | 12/1998 |
| JP | 2001308856 | 11/2001 |
| KR | 923289 | 1/1997 |
| WO | WO03061240 A1 | 7/2003 |
| WO | 03077235 | 9/2003 |

OTHER PUBLICATIONS

International Search Report—PCT/US04/032107, International Search Authority—European Patent Office—Feb. 11, 2005.

Written Opinion—PCT/US04/032107, International Search Authority—European Patent Office—Feb. 11, 2005.

International Preliminary Examination Report—PCT/US/04/32107, International Search Authority—IPEA/US—Feb. 8, 2006.

European Search Report—EP10009980—Search Authority—Munich—Sep. 12, 2011.

Nortel Networks, MBMS service priority, 3GPP TSG-SA2 #31, Apr. 11, 2003, S2-031210, URL, http://www.3gpp.org/ftp/tsg_sa/WG2_Arch/TSGS2_32_San_Diego/tdocs/S2-031210.zip.

Taiwan Search Report—TW093130692—TIPO—Mar. 30, 2012.

* cited by examiner

SCALABLE ENCODING FOR MULTICAST BROADCAST MULTIMEDIA SERVICE

CLAIM OF PRIORITY UNDER 35 U.S.C. §119

The present Application for Patent claims priority to Provisional Application No. 60/511,276 entitled "Scalable Encoding For Geran MBMS" filed Oct. 14, 2003, and assigned to the assignee hereof and hereby expressly incorporated by reference herein.

BACKGROUND

1. Field

The present invention relates generally to wireless communications, and more specifically, to communication systems for multicasting/broadcasting information to multiple users.

2. Background

Broadcast, or multicast services, refer to a communication system used to transmit information from a transmitter to multiple receivers or users. Examples of multicast/broadcast, or point-to-multipoint communication systems, include dispatch systems, such as used by police, trucking companies, and taxi companies where a central dispatcher broadcast signals to one or more vehicles. The signal may be directed to a specific vehicle or to all vehicles simultaneously.

As mobile radio networks have become commonplace, such as cellular telephone networks, customers have begun to desire to receive broadcast and multicast services such as video, multimedia, and Internet Protocol (IP) over a wireless communication link. For example, customers desire to be able to receive streaming video, such as television broadcast, on their cell phone or other portable wireless communication device. Other examples of the type of data that customers desire to receive with their wireless communication device include multimedia multicast/broadcast and Internet access.

Wireless communication systems have many applications including, for example, cellular telephones, paging, wireless local loops, personal digital assistants (PDAs), Internet telephony, and satellite communication systems. A particularly important application is cellular telephone systems for mobile subscribers. As used herein, the term "cellular" system encompasses both cellular and personal communications services (PCS) frequencies. Various over-the-air interfaces have been developed for such cellular telephone systems including frequency division multiple access (FDMA), time division multiple access (TDMA), and code division multiple access (CDMA).

Different domestic and international standards have been established to support the various air interfaces including, for example, Advanced Mobile Phone Service (AMPS), Global System for Mobile (GSM), General Packet Radio Service (GPRS), Enhanced Data GSM Environment (EDGE), Interim Standard 95 (IS-95) and its derivatives, IS-95A, IS-95B, ANSI J-STD-008 (often referred to collectively herein as IS-95), and proposed high-data-rate systems such as wideband CDMA (WCDMA). These standards are promulgated by the Telecommunication Industry Association (TIA), 3rd Generation partnership Project (3GPP) and other well-known standards bodies.

Broadcast techniques for use in the various air interfaces are also beginning to become standardized. One type of multicast/broadcast in wireless communication systems that is beginning to become standardized is Multicast Broadcast Multimedia Service (MBMS) in the 3GPP. A goal of MBMS in 3GPP is to provide a medium to high speed service to multiple users in a radio-efficient way. Different versions of MBMS are being developed and standardized for at least two air interfaces, WCDMA and GSM/GPRS/EDGE.

Continuing advancements in wireless communication devices result in newer devices having enhanced capabilities. As new wireless communication devices with enhanced capabilities are introduced to the market it is common for users with devices of varying capability to desire receiving the same MBMS, or at least similar versions of the same MBMS, according to the capabilities of the respective devices.

In a parallel fashion, users in different locations will experience different radio impairments. It is also common for users with different reception qualities to desire receiving the same MBMS, or at least similar versions of the same MBMS, according to those reception qualities.

There is therefore a need in the art for a technique enabling wireless communication devices with different capabilities, or experiencing different reception qualities, to receive similar versions of the same MBMS, corresponding to those capabilities.

SUMMARY

Embodiments disclosed herein address the above stated needs by scalable encoding of content that is broadcasting in a wireless communication system. One aspect of the invention relates to encoding content to be multicast/broadcast into a plurality of message streams. The plurality of streams is then multicast/broadcast to wireless communication devices that receive the broadcast. Each of the wireless communication devices includes a decoder for decoding selected ones of the plurality of streams in accordance with a configuration of the wireless device.

Additional aspects include that the plurality of message streams provide cumulative information and the streams can have a hierarchical structure. One of the pluralities of streams provided is a base stream that includes a base portion of the content. Additional streams provide refinement to the base portion of the content.

In one embodiment the multiple streams are assigned to multiple timeslots in a GSM system. The assignment of a stream to a particular timeslot can be communicated by an out-of-band signal or an in-band signal. In another embodiment the multiple streams are assigned to multiple codes in a CDMA system. The assignment of a stream to a particular code can be communicated by an out-of-band signal or an in-band signal. In yet another embodiment the multiple streams are assigned to multiple sub-carriers in an OFDM system. The assignment of a stream to a particular sub-carrier can be communicated by an out-of-band signal or an in-band signal.

A wireless device in the communication system can be constructed such that its configuration, and the streams that it will decode, can be determined based on the wireless device's capability to decode multiple streams. In addition, the configuration of the wireless device can be further determined based on a subscriber level of the wireless device.

A further aspect is that the wireless communication device can include a receiver configured to accept a broadcast of a plurality of streams, and a decoder configured to accept the received data streams and decode selected ones of the plurality of streams in accordance with a configuration of the wireless device. The configuration of the wireless device can be predetermined, such as based on the wireless device's capability to decode multiple streams. In addition, the configuration of the wireless device can be further determined based on a subscriber level of the wireless device. The decoded streams can be combined to produce a combined content that is presented to a user.

Yet another aspect is a scalable encoder configured to accept content and to output a plurality of streams to be broadcast. The plurality of streams may provide cumulative information and they can have a hierarchical structure. One of the pluralities of streams provided is a base portion of the content. Additional streams provide refinement to the base portion of the content.

Other features and advantages of the present invention should be apparent from the following description of exemplary embodiments, which illustrate, by way of example, aspects of the invention.

DETAILED DESCRIPTION

The word "exemplary" is used herein to mean "serving as an example, instance, or illustration." Any embodiment described herein as "exemplary" is not necessarily to be construed as preferred or advantageous over other embodiments.

An aspect of the invention is to provide scalable encoding, and a technique and apparatus for providing Multicast Broadcast Multimedia Service (MBMS) broadcast to wireless communication devices (WCD) in a communication system irrespective of the WCD's capability. The scalable encoding can provide different levels, or features or enhancements, of MBMS to different WCD's depending on the WCD subscription level. For example, a user may have a WCD that has the capability to receive a full featured, or fully enhanced, MBMS, but the user may desire to only receive a reduced enhanced version of the MBMS, for example, at a reduced expense as compared with the fully enhanced version. Likewise, a user may have a WCD that is not capable of receiving a fully enhanced MBMS, yet the user still desires to receive a reduced enhanced version of the MBMS. It is noted that multicasting refers to sending content to a selected group of WCDs within the network, whereas broadcasting refers to sending content to all WCDs within the network. The term multicasting/broadcasting refers to either multicasting, or broadcasting, or both.

In another aspect, the content of a MBMS broadcast can be encoded into multiple message streams, wherein one or more streams can be a "base" content of the MBMS and other streams can include enhancements to the base content. The base and enhancement streams are cumulative in that they can be combined to produce content. The base and enhancement streams can also have a hierarchical structure so that successive enhancement streams can be added to the base and previous enhancement streams to develop further enhanced content. For example, an enhancement stream can include data that, when combined with the base stream, provides greater fidelity for a video, audio, or graphics presentation.

If a WCD is only capable of receiving, or has only subscribed to, the base portion of the MBMS broadcast, then that is all that it will decode. Likewise, if a WCD is capable of receiving, and has subscribed to, enhanced portions of a MBMS broadcast, then it will receive and decode the base portion and the appropriate enhanced portions of the broadcast.

Figure 1:
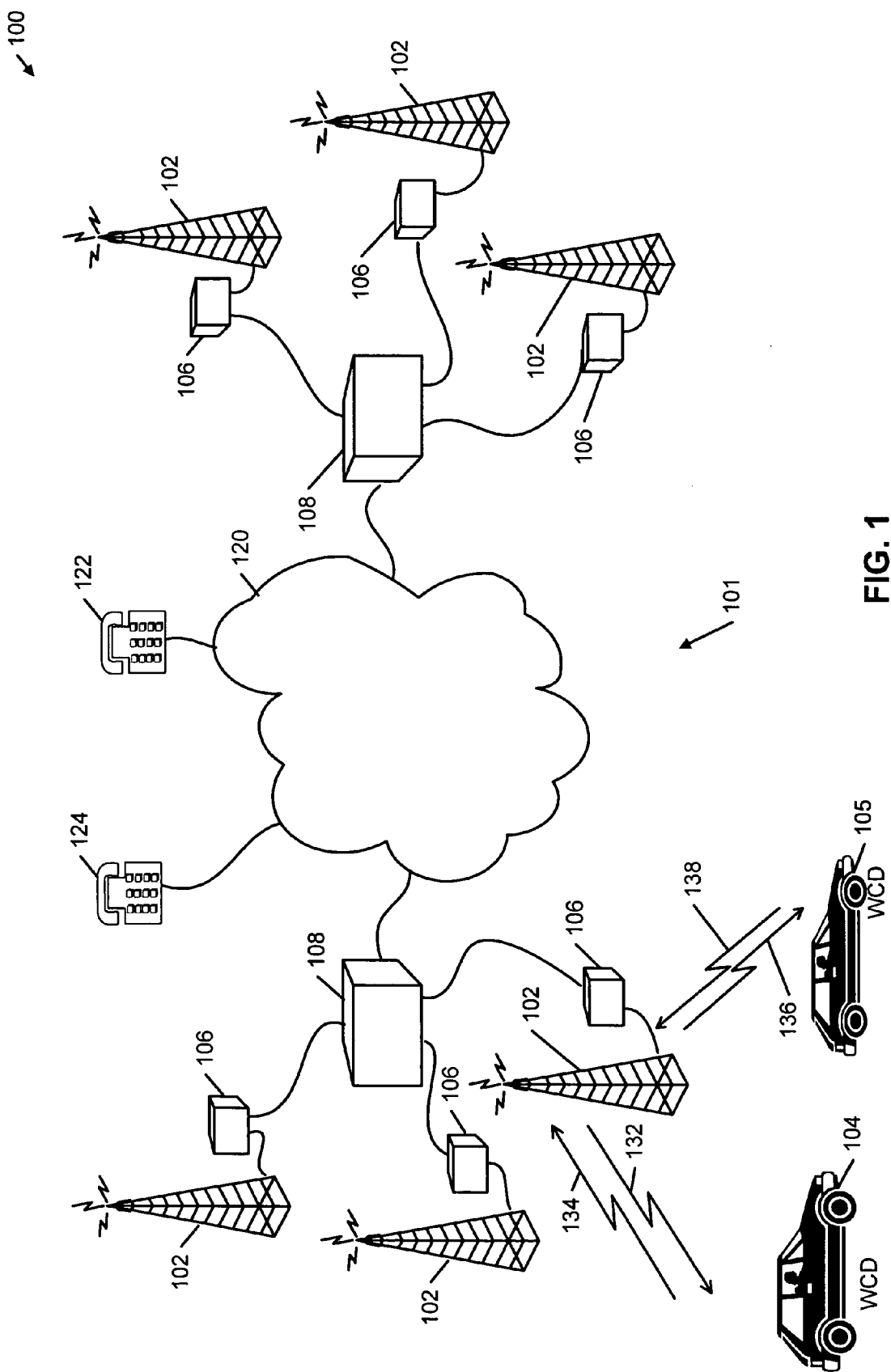
FIG. 1 shows portions of a communication system 100 constructed in accordance with the present invention.

FIG. 1 shows portions of a communication system 100 constructed in accordance with the present invention. The communication system 100 includes infrastructure 101, multiple WCDs or mobile stations (MS) 104 and 105, and landline communication devices 122 and 124. In general, WCDs may be either mobile or fixed.

Examples of WCDs 104 include cellular telephones, wireless communication enabled personal computers, and personal digital assistants (PDA), and other wireless devices. The communication system 100 may be designed to support one or more wireless standards. For example, the standards may include standards referred to as TIA/EIA-95-B (IS-95), TIA/EIA-98-C (IS-98), $3^{rd}$ Generation Partnership Project (3GPP); $3^{rd}$ Generation Partnership Project 2 (3GPP2), cdma2000, Wideband CDMA (WCDMA), and others.

The infrastructure 101 also includes other components, such as base stations 102, base station controllers 106, mobile switching centers 108, a switching network 120, and the like. In one embodiment, the base station 102 is integrated with the base station controller 106, and in other embodiments the base station 102 and the base station controller 106 are separate components. Different types of switching networks 120 may be used to route signals in the communication system 100, for example, the switching network 120 may be the public switched telephone network (PSTN).

The term "air interface" refers to the signal paths between the infrastructure and the WCD. Typically, the term "forward link" refers to the air interface signal path from the infrastructure to a WCD, and the term "reverse link" refers to the air interface signal path from a WCD to the infrastructure. As shown in FIG. 1, WCDs 104 and 105 receive signals 132 and 136 on the forward link and transmit signals 134 and 138 on the reverse link. In general, a MBMS signal transmitted from one or more base stations 102 to multiple WCDs 104 and 105. The same MBMS signal is transmitted to each intended WCD yet each WCD may have different capabilities, or subscription levels, and thereby is able to decode different features, or enhancements, of the MBMS signal. Thus it would be advantageous to encode the MBMS signal into multiple streams so that each WCD can decode a desired set of streams and thereby receive a desired version of the MBMS.

Figure 2:
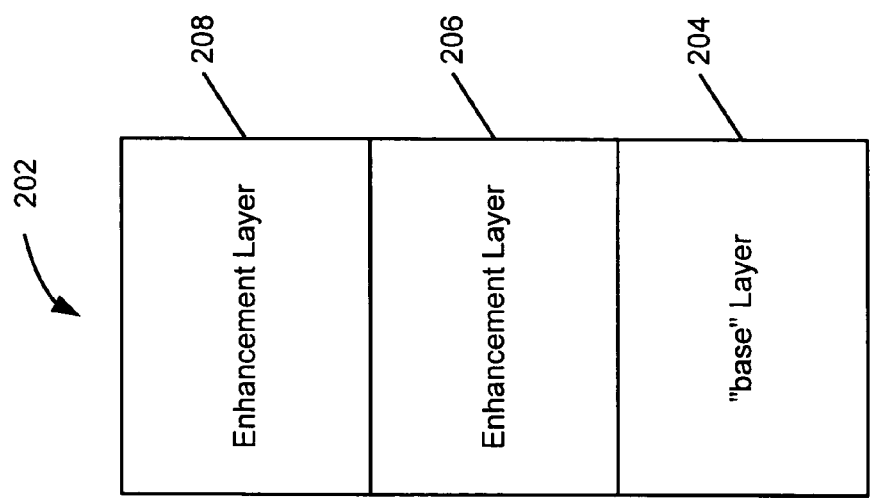
FIG. 2 is a block diagram illustrating a technique for scalable encoding of a MBMS signal into multiple streams.

FIG. 2 is a block diagram illustrating a technique for scalable encoding of a MBMS signal into multiple streams. In FIG. 2 a block representing a fully enhanced MBMS signal 202 may require 2 Mbps of bandwidth to transmit. The MBMS signal can be divided into multiple portions, a first portion 204 that is a minimum bandwidth needed to receive a "base" portion of the MBMS signal. Additional portions of the MBMS signal 206 and 208 include enhancements, or added features, to the base portion. Each portion of the MBMS signal can be encoded into one of more separate streams.

For example, if the MBMS signal is a video signal, it could be encoded in three separate streams, as follows:

Stream 1—Video in low quality and in black & white
Stream 2—Color information
Stream 3—Further refinements to the video information.

In this example, Stream 1, the video signal in low quality black & white, corresponds to the base signal 204. Streams 2 and 3, color information and further refinements, correspond to enhancement signals 206 and 208.

A receiver that only has the capability of receiving, or has only subscribed to, the base version, corresponding to Stream 1, will decode and visualize the video in black and white and with low visual quality. Similarly, a receiver that is capable of receiving, and has subscribed to, an enhanced version of the MBMS can decode Streams 1 and 2, and will visualize the video in color and with low visual quality. Likewise, a receiver that is capable of receiving, and has subscribed to, a fully enhanced version of the MBMS can decode Streams 1, 2 and 3 and will visualize the video in color and with higher visual quality. Specific application-layer techniques to perform the scalable encoding are known in the art.

Different techniques can be used to inform users that content is being sent in multiple streams. Two such techniques include out-of-band signaling and in-band signaling. Out-of-band signaling, also referred to as upper layer signaling, can be used to communicate information about the format of the multiple streams in a band, or communication channel, that does not include the multiple streams, such as in a control channel. For example, an appropriate upper layer signaling message can be used to communicate, or identify, which data streams are included within a particular timeslot.

In-band signaling, which includes information about the format of the multiple bands embedded within a base stream of the MBMS, can also be used to inform users that content is being sent in multiple streams. For example, a header of one of the data streams, such as the data stream that includes the base portion of the content, can be used to communicate, or identify, which data streams are included within a particular timeslot.

Figure 3:
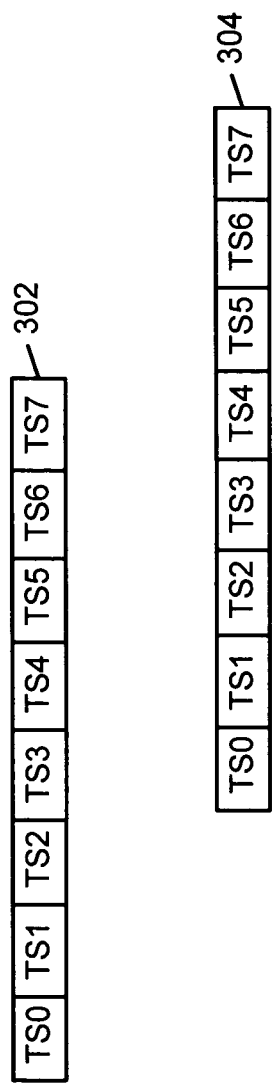
FIG. 3 is a block diagram illustrating two radio frames 302 and 304 in the GSM air interface.

Different air interfaces can take advantage of aspects of the invention. FIG. 3 is a block diagram illustrating two radio frames 302 and 304 in the GSM air interface. As shown in FIG. 3, the GSM air interface radio frames 302 and 304, are each divided into eight timeslots, and individual timeslots are assigned to particular users in the system. In addition, GSM transmission and reception use two different frequencies and forward link and reverse link are offset by three timeslots. For example, in FIG. 3 a downlink radio frame 302 would be transmitted at one frequency and an uplink radio frame 304 would be transmitted at a different frequency. The downlink radio frame 302 is offset by three time slots, TS0-TS2, from the uplink radio frame. Having an offset between the downlink and uplink radio frames allows wireless communication devices, or terminals, to be able to operate without having to be able to transmit and receive at the same time.

Advancements in GSM wireless communication devices, or terminals, have resulted in GSM terminals that can be differentiated by their capability to receive multiple timeslots during the same radio frames. These are called "multislot classes" and can be found in Annex B of 3GPP TS 45.002, incorporated herein in its entirety.

It is reasonable to be expected that at any given point in time different GSM terminals with different reception capabilities will be present in the market. For example, in GSM a WCD may support reception and decoding of multiple timeslots during a single radio frame. By encoding the MBMS content into multiple "streams" and transmitting the multiple streams in different timeslots within radio frames, the multiple streams can be received by WCDs. WCDs that do not support multislot communications can decode a desired, or base, stream that would contain a basic level of the content. WCDs that support multislot communications can decode additional content streams that provide enhancements to the base content. Using the example of a video signal described with FIG. 2, the base stream that provides a low resolution black and white video signal may be assigned to one or more timeslots, for example time slots TS0 and TS2. Additional streams may enhance the base stream by adding, for example, color or high resolution or both may be assigned to one or more different timeslots. For example, a color enhancement stream may be assigned to TS4 and a high resolution enhancement stream may be added to TS6. In this example, the base station would notify the WCDs, for example using either out-of-band or in-band signaling, that the base stream is included within time slots TS0 and TS2 and that a color enhancement stream is included within TS4 and a high resolution enhancement stream is included within TS5, and the WCDs can adjust their reception accordingly. The base and enhancement streams may be added to any of the time slots as desired.

A similar technique can be used in a communication system based on a CDMA air interface that uses multiple codes, referred to as Walsh codes, to communicate between the information between base stations and WCDs, and individual codes are assigned to particular users in the system. Using the previous example, a low resolution black and white video signal may be assigned to one or more codes. Additional enhancement streams may be assigned to other codes. Again, the base station would notify the WCDs, for example using either out-of-band or in-band signaling, that the base stream is included within a particular code(s) and that a color enhancement stream a high resolution enhancement stream are include in other codes. Using this information the WCDs can adjust their reception accordingly. The base and enhancement streams may be added to any of the codes slots as desired.

Further, a similar technique can be used in a communication system based on an Orthogonal Frequency Division Multiplexing (OFDM) air interface. In an OFDM air interface, multiple sub-carriers are transmitted simultaneously at different frequencies to a receiver. In an OFDM system multiple streams can be assigned to different sub-carriers. Again, using the previous example, a low resolution black and white video signal may be assigned to one or more sub-carriers. Additional enhancement streams may be assigned to other sub-carriers. The base station would notify the WCDs, for example using either out-of-band or in-band signaling, that the base stream is included within a particular sub-carrier(s) and that a color enhancement stream and a high resolution enhancement stream are included in other sub-carriers. Using this information the WCDs can adjust their reception accordingly. The base and enhancement streams may be added to any of the sub-carriers as desired.

A scalable encoding technique that allows the reception of MBMS by all WCDs, or terminals, irrespective of their capabilities while at the same time, granting a better service with users with more capable WCD, or terminals, is desirable. For example, a GSM network can place separate streams, for example Streams 1, 2 & 3 mentioned above, on contiguous groups of timeslots. WCDs, or terminals, capable of receiving only a limited number of timeslots will receive and decode the base streams. WCDs, or terminals, with higher capabilities, or with better reception quality, can receive and decode the full MBMS information.

For example, referring to the previous example where a video MBMS signal was separated into three streams, the network could place:

Stream 1 on timeslots 0,1,2,3
Stream 2 on timeslots 4
Stream 3 on timeslots 5

Generally, GSM terminals, or WCDs, become incrementally more complicated for higher multislot classes, for example, when they have to be able to decode a high number of timeslots. Therefore, a terminal capable of receiving six timeslots (designated from 0 to 5) will be more complicated than a terminal capable of receiving four timeslots (from 0 to 3). Using scalable encoding allows a less capable terminal to receive at least a basic version of the information, such as Stream 1, while at the same time allowing a most capable terminal to take full advantage of its capabilities.

It should be noted that scalable encoding is not dependent on the radio conditions, and instead depends on the terminal capabilities. If a GSM MBMS signal is transmitted at full power with equal power allocated to each stream all the different streams should experience similar radio conditions. It is appreciated that different power levels, or resources, may be allocated to different streams. For example, additional power, or resources, may be allocated to the base stream to improve reception of the base stream over the air interface. The network can also place incremental streams in contiguous, non-contiguous, or other combinations of timeslots and indicate this appropriately to the WCDs, or terminals.

Figure 4:
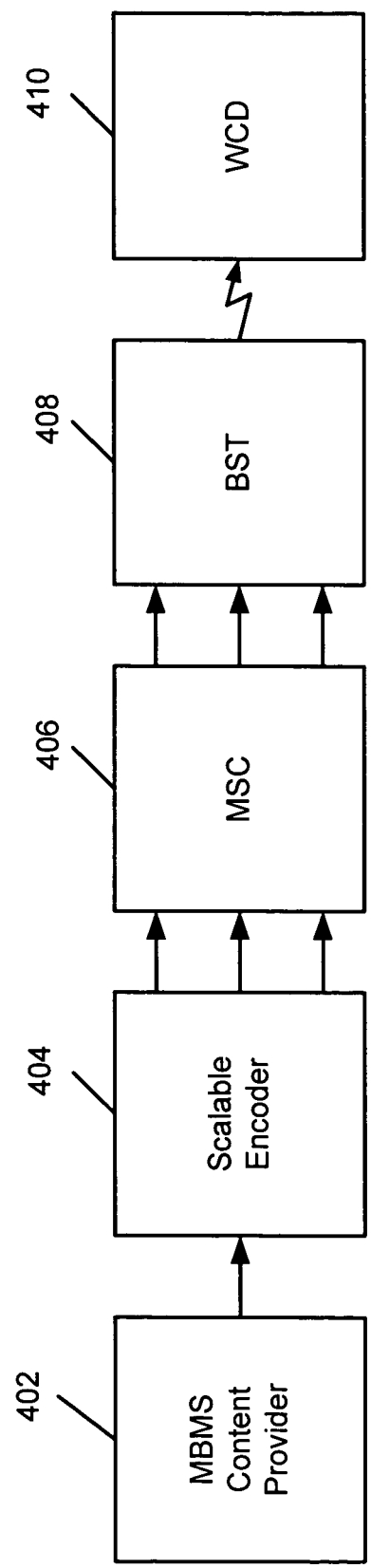
FIG. 4 is a block diagram illustrating portions of an exemplary wireless communication system that can deliver MBMS content stream.

FIG. 4 illustrates portions of an exemplary wireless communication system that can deliver MBMS content stream. As shown in FIG. 4, the wireless communication system includes components in a network infrastructure, such as a MBMS content server 402, and a scalable encoder 404. The scalable encoder 404 receives the MBMS signal from the content server 402, encodes the signal, and outputs multiple streams of content. The network infrastructure can also include components to route signals and messages through the network and radio transceiver equipment, such as a mobile switching center (MSC) 406 and base station transceiver (BST) 408 respectively, to transmit and receive signals from wireless communication devices (WCD) 410. Although the scalable encoder 404 is shown as a separate component it is appreciated that the scalable encoder 404 can be included within the MBMS content provider 402, the MSC 406, the BST 408, or other places within the wireless network infrastructure.

Figure 5:
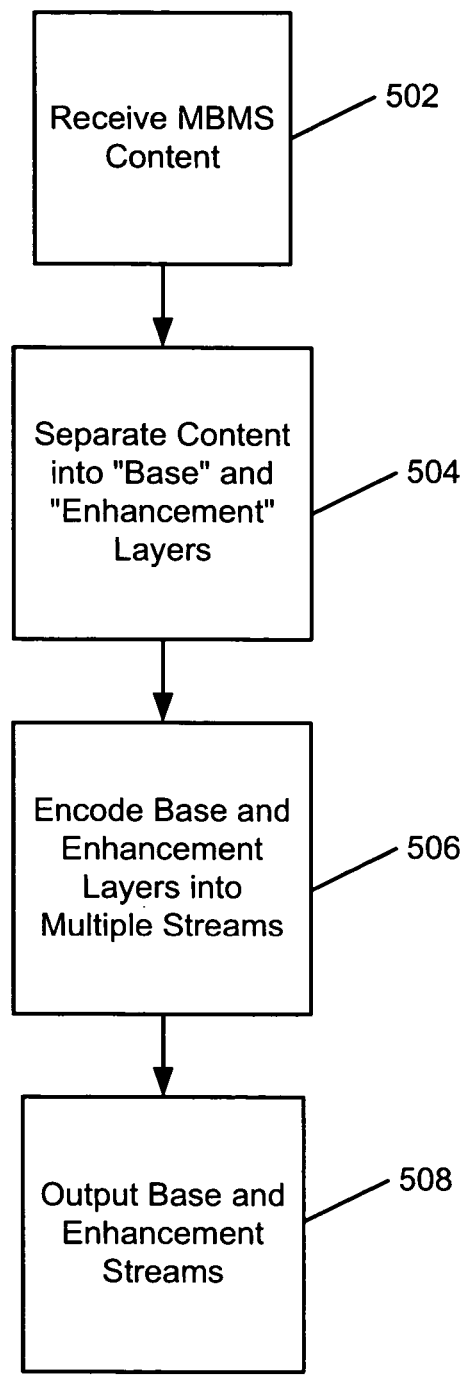
FIG. 5 is a flow diagram illustrating operation of an exemplary scalable encoder.

FIG. 5 is a flow diagram illustrating operation of an exemplary scalable encoder. Flow begins in block 502 where the encoder receives MBMS content. Flow continues to block 504 where the content is separated into "base" and "enhancement" layers. The base and enhancement layers are output to block 506. Alternatively, an MBMS content provider can output separate base and enhancement layers directly.

Flow continues to block 506 where the base and enhancement layers are encoded into multiple streams. Flow continues to block 508 where the multiple streams are output.

Figure 6:
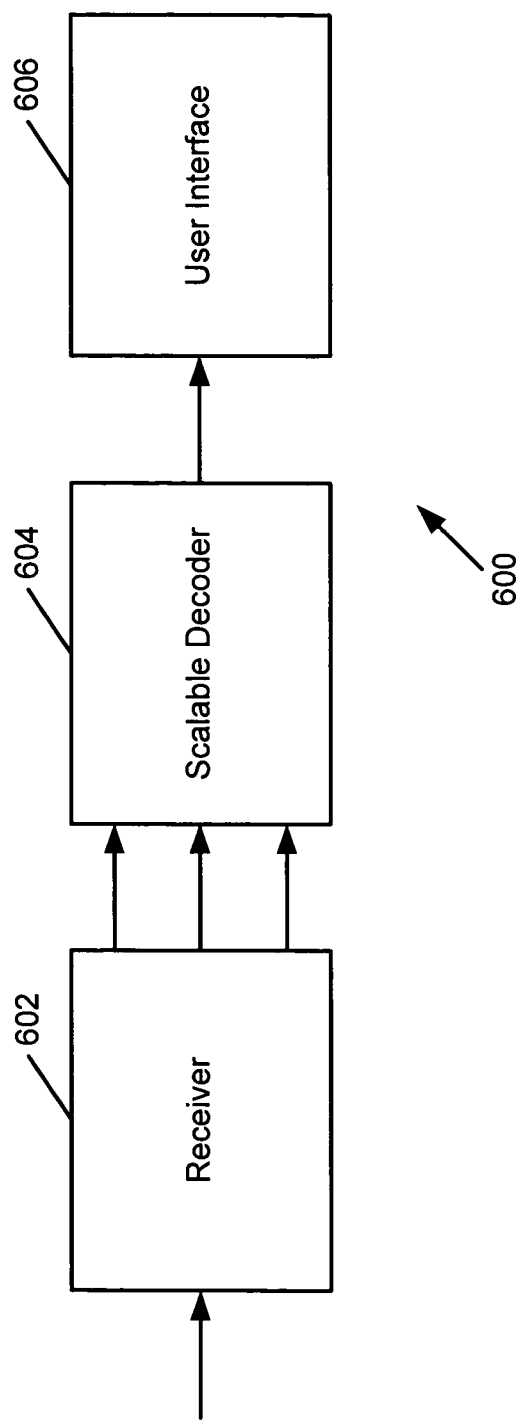
FIG. 6 is a block diagram illustrating portions of an exemplary wireless communication device that can decode MBMS content streams.

FIG. 6 is a block diagram illustrating portions of an exemplary wireless communication device that can decode MBMS content streams. As illustrated in FIG. 6, the wireless communication device 600 includes a receiver 602, a scalable decoder 604, and a user interface 606. Broadcast streams are received by the receiver 602 and output to the scalable decoder 604. The scalable decoder decodes selected ones of the received streams. The decoder may decode selected streams in accordance with a configuration of the wireless device. For example, the wireless device may be preset to only decode selected streams, or the streams decoded may vary depending on a subscription level of the wireless device, or its reception quality. For example, a user may subscribe to different levels of enhancement to the received content at different expenses accordingly. The decoded streams are combined and output to a user interface 606. The user interface conveys the content to the user and can include, for example, audio and visual outputs to the user. The scalable encoder 604 may include a general purpose processor, a application specific integrated circuit (ASIC), a field programmable gate array (FPGA), discrete components, or the like. The scalable encoder may also be implemented as a separate component or it may be combined with other components, for example, as part of a general processor that performs other functions in addition to scalable decoding.

Figure 7:
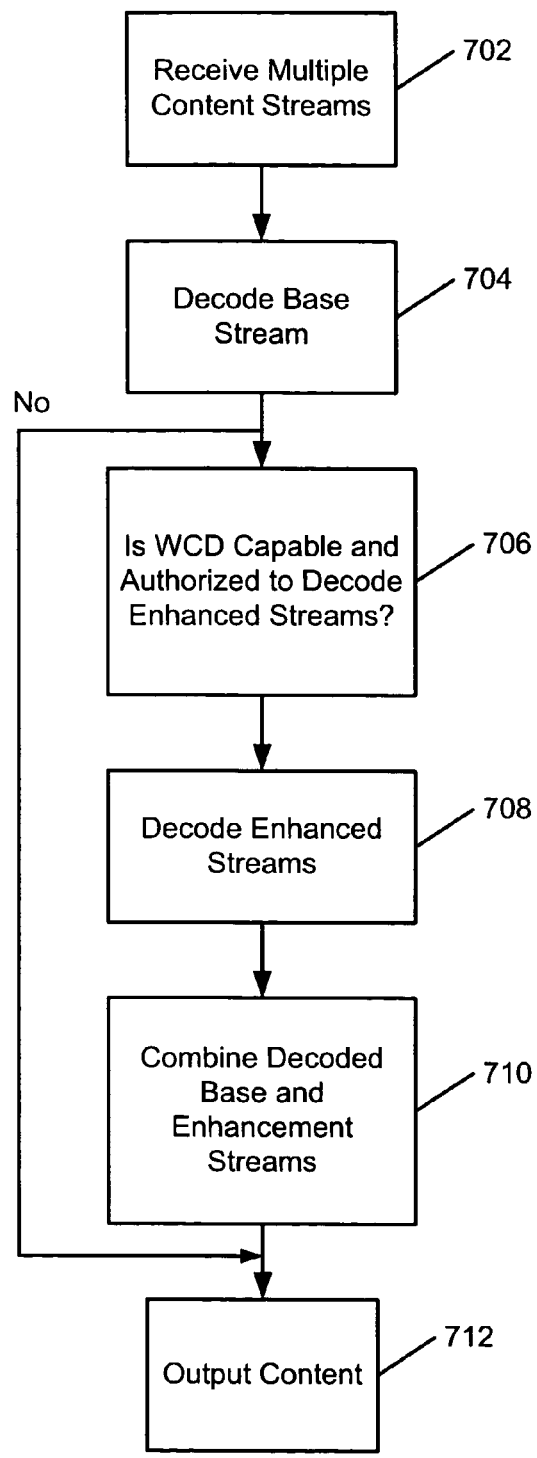
FIG. 7 is a flow diagram illustrating operation of an exemplary scalable decoder.

FIG. 7 is a flow diagram illustrating operation of an exemplary scalable decoder. Flow begins in block 702 where the decoder receives MBMS content streams. Flow continues to block 704 where, if the user has subscribed to the MBMS, the base stream is decoded. Flow continues to block 706. In block 706 it is determined if the WCD is capable of, and has subscribed or is authorize, to decode enhancement streams of the content. If the WCD is capable and authorized to decode enhancement streams flow continues to block 708. In block 708 authorized enhancement streams are decoded. Flow continues to block 710 where the decoded base content is combined with the decoded enhancement content. Flow continues to block 712 where the decoded content is output. Returning to Block 706, if the WCD is either not capable of, or not authorized or has not subscribed to, decoding enhancement streams flow continues to block 612 and the decoded base content is output.

Figure 8:
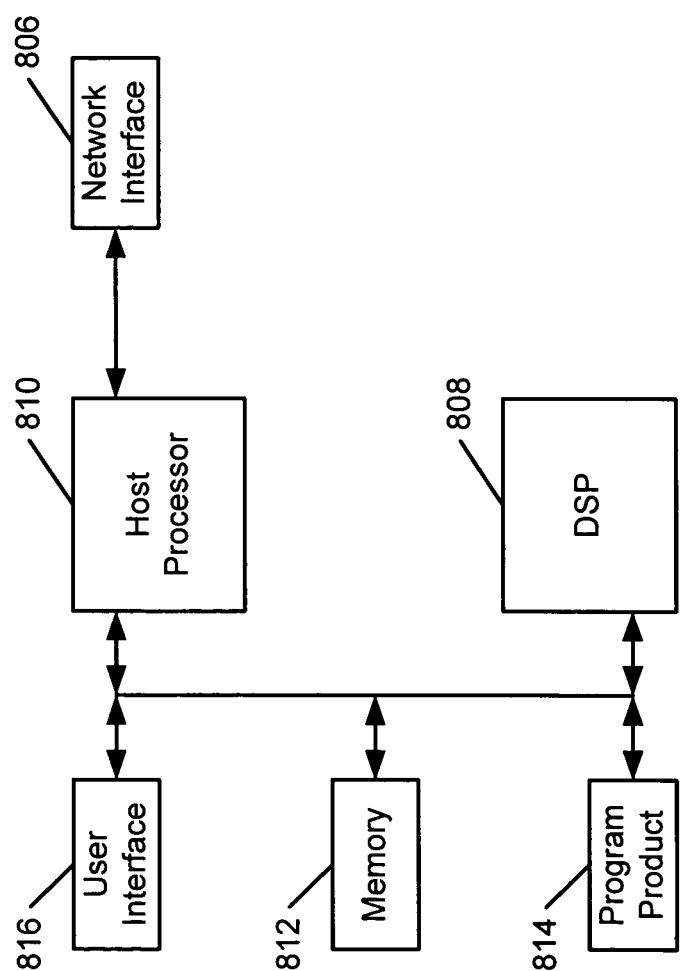
FIG. 8 is a block diagram of a wireless communication device constructed in accordance with an exemplary embodiment of the present invention.

FIG. 8 is a block diagram of a wireless communication device constructed in accordance with an exemplary embodiment of the present invention. The communication device 802 includes a network interface 806, digital signal processor (DSP) 808, a host processor 810, a memory device 812, a program product 814, and a user interface 816.

Signals from the infrastructure are received by the network interface 806 and sent to the host processor 810. The host processor 810 receives the signals and, depending on the content of the signal, responds with appropriate actions. For example, the host processor 810 may decode the received signal itself, or it may route the received signal to the DSP 808 for decoding.

In one embodiment, the network interface 806 may be a transceiver and an antenna to interface to the infrastructure over a wireless channel. In another embodiment, the network interface 806 may be a network interface card used to interface to the infrastructure over landlines.

Both the host processor 810 and the DSP 808 are connected to a memory device 812. The memory device 812 may be used to store data during operation of the WCD, as well as store program code that will be executed by the host processor 810 or the DSP 808. For example, the host processor, DSP, or both, may operate under the control of programming instructions that are temporarily stored in the memory device 812. The host processor and DSP also can include program storage memory of their own. When the programming instructions are executed, the host processor 810 or DSP 808, or both, perform their functions, for example decoding content streams. Thus, the programming steps implement the functionality of the respective host processor or CPU, and DSP, so that the host processor and DSP can each be made to perform the functions of decoding content streams as desired. The programming steps may be received from a program product

814. The program product 814 may store, and transfer the programming steps into the memory 812 for execution by the host processor, CPU, or both.

The program product 814 may be semiconductor memory chips, such as RAM memory, flash memory, ROM memory, EPROM memory, EEPROM memory, registers, as well as other storage devices such as a hard disk, a removable disk, a CD-ROM, or any other form of storage medium known in the art that may store computer readable instructions. Additionally, the program product 814 may be the source file including the program steps that is received from the network and stored into memory and is then executed. In this way, the processing steps necessary for operation in accordance with the invention may be embodied on the program product 814. In FIG. 8, the exemplary storage medium is shown coupled to the host processor such that the host processor may read information from, and write information to, the storage medium. Alternatively, the storage medium may be integral to the host processor.

The user interface 816 is connected to both the host processor 810 and the DSP 808. For example, the user interface may include a display and a speaker that is connected to the DSP 710 and used to output content data to the user.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The method or technique described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of multicasting/broadcasting over a communication channel comprising:
    separating a same content into a plurality of streams,
    providing a plurality of streams from the same content, each of which includes encoded cumulative information, and one or more of which is associated with a decoding authorization level, wherein the plurality of streams have a hierarchical structure,
    wherein the hierarchical structure is characterized by at least a first version corresponding to a first stream of the plurality of streams and an enhanced version corresponding to the first stream and a second stream of the plurality of streams, wherein the second stream of the plurality of streams does not comprise null data, and
    multicasting/broadcasting the plurality of streams over a network, wherein each of the plurality of streams is separately encoded for selecting decoding by a receiving device and a set of one or more of the plurality of streams forms the first version and the enhanced version of the same content,
    wherein the selective decoding is based at least in part on the decoding authorization level associated with the stream.

2. A method as defined in claim 1, wherein one of the plurality of streams provides a base stream that includes a base portion of the content.

3. A method as defined in claim 2, wherein at least one of the remaining streams provides enhancement to the base portion of the content.

4. A method as defined in claim 1, wherein the communication channel is part of a GSM system.

5. A method as defined in claim 1, wherein the plurality of data streams are included in multiple timeslots.

6. A method as defined in claim 5, wherein identification of data streams included within a particular timeslot is communicated in an out-of-band communication.

7. A method as defined in claim 6, wherein the out-of-band communication is an upper layer signaling message.

8. A method as defined in claim 5, wherein identification of data streams included within a particular timeslot is communicated in an in-band communication.

9. A method as defined in claim 8, wherein the in-band communication is included in a header of one of the plurality of streams.

10. A method as defined in claim 9, wherein the one of the plurality of streams includes a base portion of the content.

11. A method as defined in claim 1, wherein the communication channel is part of a CDMA system.

12. A method as defined in claim 11, wherein the plurality of data streams are included in multiple codes.

13. A method as defined in claim 12, wherein identification of data streams included within a particular code is communicated in an out-of-band communication.

14. A method as defined in claim 13, wherein the out-of-band communication is an upper layer signaling message.

15. A method as defined in claim 1, wherein identification of data streams included within a particular code is communicated in an in-band communication.

16. A method as defined in claim 15, wherein the in-band communication is included in a header of one of the plurality of streams.

17. A method as defined in claim 16, wherein the one of the plurality of streams includes a base portion of the content.

18. A method as defined in claim 1, wherein the communication channel is part of a OFDM system.

19. A method as defined in claim 18, wherein the plurality of data streams are included in sub-carriers.

20. A method as defined in claim 18, wherein identification of data streams included within a particular sub-carrier is communicated in an out-of-band communication.

21. A method as defined in claim 20, wherein the out-of-band communication is an upper layer signaling message.

22. A method as defined in claim 18, wherein identification of data streams included within a particular sub-carrier is communicated in an in-band communication.

23. A method as defined in claim 22, wherein the in-band communication is included in a header of one of the plurality of streams.

24. A method as defined in claim 23, wherein the one of the plurality of streams includes a base portion of the content.

25. An encoder in a wireless communication system, the encoder configured to:
   accept a same content and separate the same content into a plurality of streams,
   encode the same content, wherein each of the plurality of streams is separately encoded for selecting decoding by a receiving device, and to
   output the plurality of streams from the same content to be broadcast over a network,
   wherein the plurality of streams have a hierarchical structure,
   wherein the hierarchical structure is characterized by at least a first version corresponding to a first stream of the plurality of streams and an enhanced version corresponding to the first stream and a second stream of the plurality of streams, wherein the second stream of the plurality of streams does not comprise null data,
   wherein each of the plurality of streams provide cumulative information, one or more of the plurality of streams has an associated decoding authorization level, the selecting decoding based at least in part on the decoding authorization level and a set of one or more of the plurality of streams forms the first version and the enhanced version of the same content.

26. An encoder as defined in claim 25, wherein one of the plurality of streams provides is a base portion of the content.

27. An encoder as defined in claim 26, wherein additional streams provide enhancement to the base portion of the content.

28. An encoder as defined in claim 25, wherein the encoder is part of a GSM system.

29. An encoder as defined in claim 25, wherein the plurality of data streams are included in multiple timeslots.

30. An encoder as defined in claim 29, wherein identification of data streams included within a particular timeslot is included in an out-of-band communication.

31. An encoder as defined in claim 30, wherein the out-of-band communication is an upper layer signaling message.

32. An encoder as defined in claim 29, wherein identification of data streams included within a particular timeslot is included in an in-band communication.

33. An encoder as defined in claim 32, wherein the in-band communication is included in a header of one of the plurality of streams.

34. An encoder as defined in claim 33, wherein the one of the plurality of streams includes a base portion of the content.

35. An encoder as defined in claim 25, wherein the encoder is part of a CDMA system.

36. An encoder as defined in claim 35, wherein the plurality of data streams are included in multiple codes.

37. An encoder as defined in claim 36, wherein identification of data streams included within a particular code is included in an out-of-band communication.

38. An encoder as defined in claim 37, wherein the out-of-band communication is an upper layer signaling message.

39. An encoder as defined in claim 36, wherein identification of data streams included within a particular code is included in an in-band communication.

40. An encoder as defined in claim 39, wherein the in-band communication is included in a header of one of the plurality of streams.

41. An encoder as defined in claim 40, wherein the one of the plurality of streams includes a base portion of the content.

42. An encoder as defined in claim 25, wherein the encoder is part of an OFDM system.

43. An encoder as defined in claim 42, wherein the plurality of data streams are included in sub-carriers.

44. An encoder as defined in claim 42, wherein identification of data streams included within a particular sub-carrier is included in an out-of-band communication.

45. An encoder as defined in claim 44, wherein the out-of-band communication is an upper layer signaling message.

46. An encoder as defined in claim 42, wherein identification of data streams included within a particular sub-carrier is included in an in-band communication.

47. An encoder as defined in claim 46, wherein the in-band communication is included in a header of one of the plurality of streams.

48. An encoder as defined in claim 47, wherein the one of the plurality of streams includes a base portion of the content.

49. A non-transitory computer readable media embodying a method of encoding broadcast content, the method comprising:
   receiving a same content to be broadcast over a network and separating the same content into a plurality of streams;
   encoding a base portion of the same content and outputting a base stream;
   encoding additional enhancement portions of the same content in additional streams, the additional streams having a hierarchical structure;
   wherein the hierarchical structure is characterized by at least a first version corresponding to a first stream of the plurality of streams and an enhanced version corresponding to the first stream and a second stream of the plurality of streams, wherein the second stream of the plurality of streams does not comprise null data;
   associating a decoding authorization level with one or more of the additional streams, and outputting the additional streams, wherein the base and additional enhancement portions are from the same content and each includes cumulative information and each are separately encoded, the additional streams encoded for selective decoding based at least in part on the decoding authorization level associated with the stream, and a set of one or more of the plurality of streams forms the first version and the enhanced version of the same content.

50. An apparatus for encoding broadcast content, the apparatus comprising:
- means for receiving a same content to be broadcast over a network and separating the same content into a plurality of streams;
- means for encoding a base portion of the same content and outputting a base stream; and
- means for encoding additional enhancement portions of the same content as one or more additional streams, the additional streams having a hierarchical structure,
- wherein the hierarchical structure is characterized by at least a first version corresponding to a first stream of the plurality of streams and an enhanced version corresponding to the first stream and a second stream of the plurality of streams, wherein the second stream of the plurality of streams does not comprise null data,
- associating a decoding authorization level with the one or more additional streams, the additional streams encoded for selective decoding based at least in part on the decoding authorization level associated with the stream, and outputting the one or more additional streams, and a set of one or more of the plurality of streams forms the first version and the enhanced version of the same content.

* * * * *